United States Patent [19]

Fukushima

[11] Patent Number: 4,844,224

[45] Date of Patent: Jul. 4, 1989

[54] FLYWHEEL ASSEMBLY

[75] Inventor: Hirotaka Fukushima, Hirakata, Japan

[73] Assignee: Kabushiki Kaisha Daikin Seisakusho, Neyagawa, Japan

[21] Appl. No.: 184,634

[22] PCT Filed: Jul. 24, 1987

[86] PCT No.: PCT/JP87/00544

§ 371 Date: Apr. 1, 1988

§ 102(e) Date: Apr. 1, 1988

[87] PCT Pub. No.: WO88/01027

PCT Pub. Date: Feb. 11, 1988

[30] Foreign Application Priority Data

Aug. 4, 1986 [JP] Japan ................. 61-182965

[51] Int. Cl.$^4$ ............... F16F 15/12; F16F 15/30; F16D 3/14

[52] U.S. Cl. ................. 192/70.17; 192/70.27; 192/106.2; 74/574

[58] Field of Search ............ 192/30 V, 70.17, 70.3, 192/106.2, 70.29, 70.27; 74/574; 464/6 B

[56] References Cited

U.S. PATENT DOCUMENTS 2,822,071  2/1958  Hautzenroeder ............ 192/70.3
4,751,993  6/1988  Fukushima ............... 74/574

FOREIGN PATENT DOCUMENTS 3609048  10/1986  Fed. Rep. of Germany ........ 74/574
57-18049   4/1982  Japan .
60-227019 11/1985  Japan .
61-201948  9/1986  Japan .
2153929    8/1985  United Kingdom ............ 192/30 V Primary Examiner—Rodney H. Bonck
Assistant Examiner—David A. Testardi
Attorney, Agent, or Firm—Armstrong, Nikaido, Marmelstein, Kubovcik & Murray

[57] ABSTRACT

A flywheel assembly comprises a first flywheel and a second flywheel. The first flywheel has a supporting plate and a slidable friction plate attached to and slidable with respect to the supporting plate. A damping mechanism for damping vibrations resulting from the spring force and a friction damping mechanism for damping vibration resulting from the friction force and operating on clutch engagement and disengagement is provided. An approximately disc shaped diaphragm spring is provided for preventing vibration of the second flywheel by connecting the damper plate of the friction damper mechanism to the friction plate which slides away from the clutch at the time of clutch disengagement.

6 Claims, 4 Drawing Sheets

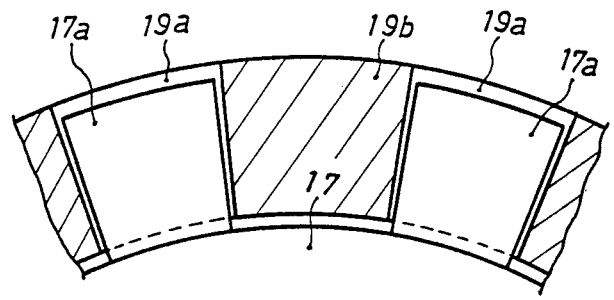
FIG.1b
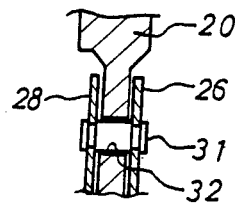
FIG.1c
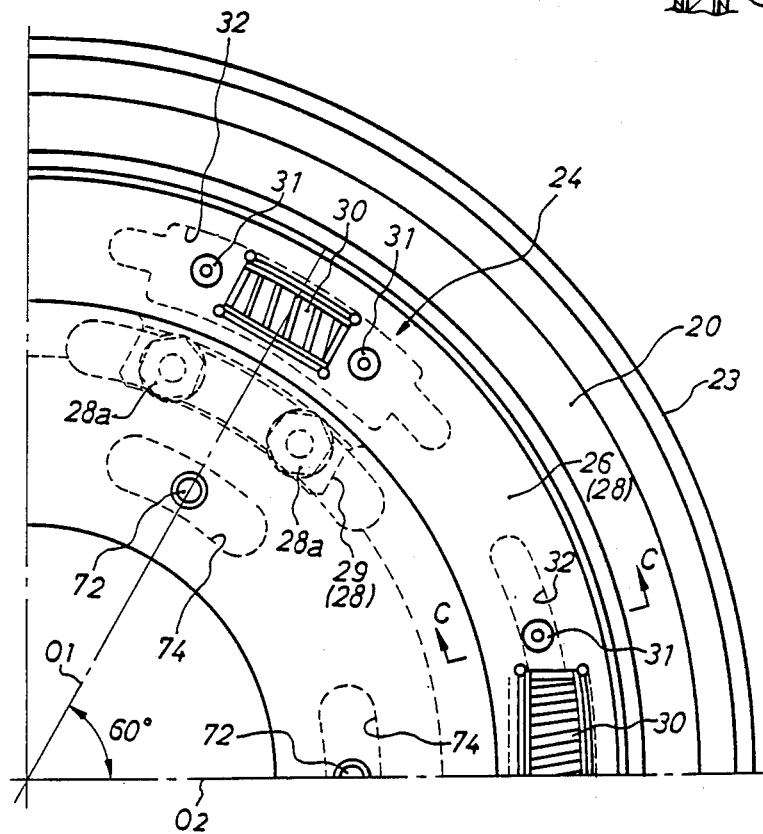
FIG.1a

FIG.4 FRONT REAR    PRIOR ART
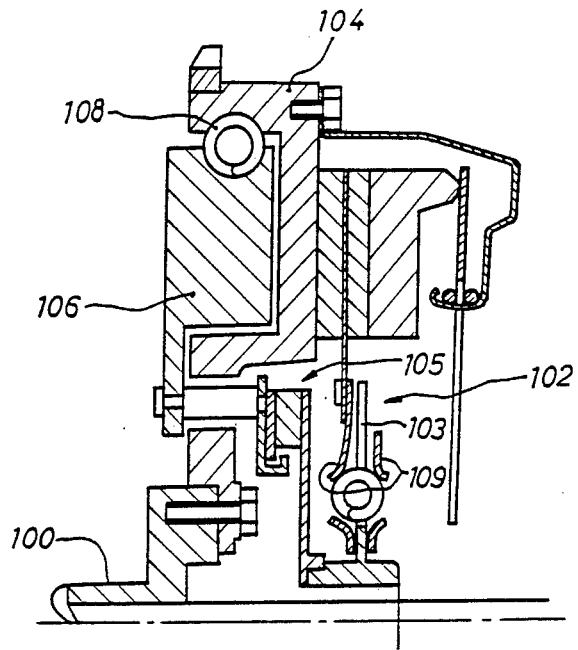
FIG.5
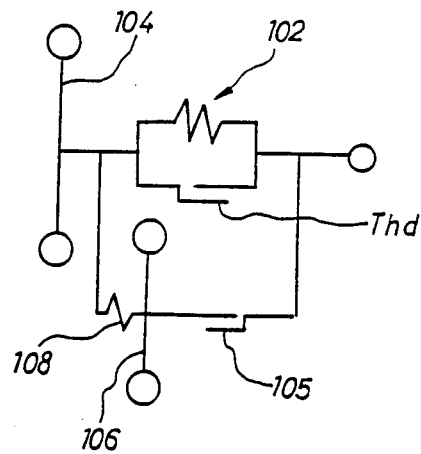

FLYWHEEL ASSEMBLY

TECHNICAL FIELD

This invention relates to a flywheel assembly for absorbing vibration.

BACKGROUND ART

The applicant of the present invention has prior hereto developed a flywheel assembly and has filed Japanese patent application No. 60-44298 and corresponding copending U.S. patent application Ser. No. 836,365, now U.S. Pat. No. 4,751,993, dated June 21, 1988, and West Germany patent application No. P 36 07 3989-13 thereon.

In prior development, as shown in FIG. 4, a first flywheel 104 fastened to an engine crank shaft 100 and engaged and disengaged by a clutch disc 102 a second flywheel 106 installed concentrically with the first flywheel and set to a specified mass, a damper mechanism 108 resiliently coupling the both flywheels, and a friction damping mechanism 105 which transmits an output from second flywheel 106 to a spline hub 103 of the clutch disc 102 and damps its vibration only when said clutch disc 102 contacts with the first flywheel 104.

As shown in FIG. 5, the first flywheel 104 and second flywheel 106 absorb an vibration which transmits from the crank shaft 100 with an power, and the frictional damping mechanism 105 damps the vibration.

However, hysteresis torque Thd generates between the hub flange 103 of the clutch disc 102 and the side plate 109 (FIG. 4). In some cases, the hysteresis torque Thd have an undesirable influence upon damping characteristics.

Further, a damping function of the frictional damping mechanism 106 for the second flywheel 106 comes to a stop, during clutch releasing operation while the clutch disc 102 is disconnected from the first flywheel 104. There is a possibility that the second flywheel will have a resonance phenomenon depending upon the frequency of the input vibration.

DISCLOSURE OF THE INVENTION

An object of the present invention is to provide a flywheel assembly which can prevent generation of hysteresis torque in a clutch disc equipped with an ordinary diaphgram spring for engage/disengage operation.

COMPOSITION OF THE INVENTION (1) Technical measure

The present invention relates to a flywheel assembly which including a first flywheel fixed to a crank shaft of an engine and a second flywheel installed concentrically with the first flywheel. The mass of the second flywheel is set to specified mass. A damper mechanism resiliently connects both flywheel. A friction damping mechanism transmits output power of the second flywheel to a spline hub of the clutch disc only when the clutch disc is connected with the first flywheel. The first flywheel is comprised of a separated supporting plate and a friction plate. The supporting plate connected to the crank shaft. The friction plate connects to the supporting plate in circumferential direction and is provided to slide axially on the supporting plate. A return spring presses the friction plate toward the clutch disc direction and is provided between the supporting plate and the friction plate. The friction damping mechanism comprised a holder connected to the second flywheel, a damper plate held by the holder and slide axially by said friction plate. A friction disc is connected to the spline hub of the clutch disc. The friction plate is pressed by the damper plate. A spring member presses the damper plate toward pressing direction of the friction disc. In the clutch engaging mode, when the friction plate presses the supporting plate against the spring force of the return spring, an output power from the second flywheel transmits to the spline hub of the clutch disc to press the damper plate onto the friction plate by the spring member of the friction damping mechanism. In clutch releasing mode when the friction plate moves toward it opposite direction to the supporting plate side by the spring force of the return spring, the damper plate slides toward releasing direction of the friction disc against the spring force of the spring member corresponding to a return operation of the friction plate and connects the second flywheel and the friction plate through the friction damping mechanism.

(2) Function

An axial pressure force of the clutch disc does not occur, and hysteresis torque is not generated in the clutch disc, because friction force of the friction damping mechanism generates by the spring force of the spring member held to the holder.

In clutch releasing mode, the friction plate is connected to the second flywheel by the damper plate of the friction damping mechanism. A resonance phenomenon of the second flywheel is prevented.

BRIEF DESCRIPTION OF THE DRAWINGS

FIG. 1a is a partial view of arrow "a" in the FIG. 1;

FIG. 1b is a partial sectional view taken on a line b—b of FIG. 1;

FIG. 1c is a partial sectional view taken on a line c—c of FIG. 1a;

FIG. 4 is schematic sectional view of my prior flywheel assembly in my copending and U.S. application Ser. No. 836,365;

FIG. 5 is a schematic view of my prior flywheel assembly of FIG. 4.

BEST MODE FOR CARRYING OUT THE INVENTION

Figure 1:
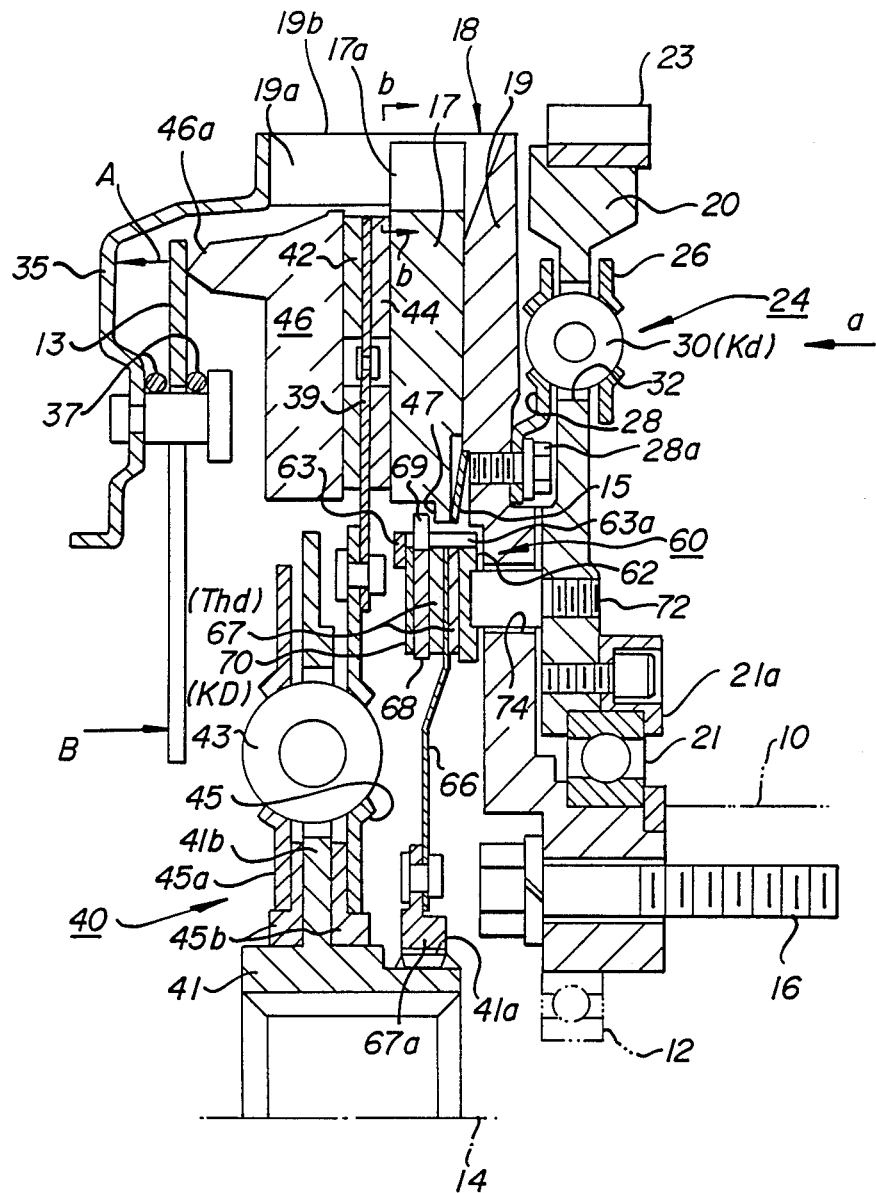
FIG. 1 is a partial vertical sectional view of a clutch applied with the present invention.
Figure 2:
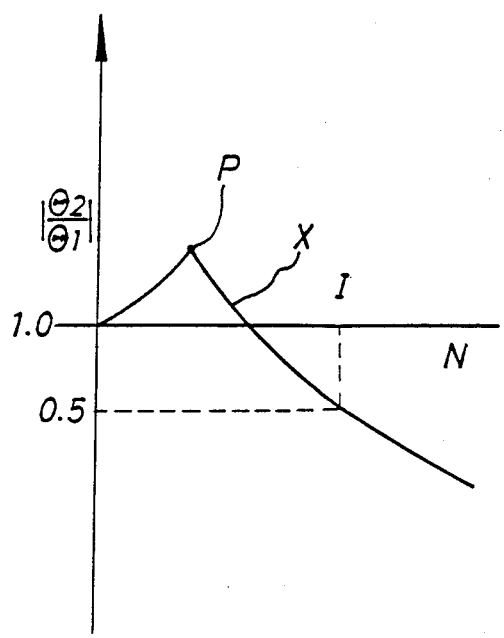
FIG. 2 is a graph showing a damping characteristics.

A clutch applied with the present invention will be described hereunder with reference to FIG. 1. In FIG. 1, numeral 10 is a rear end part of an engine crank shaft. In rearward of the crank shaft 10, an input shaft 14, shown by center line only, extends axially and connects to a drive-transmission (not shown) in a rear stage of the clutch with pilot bearing 12 therebetween.

A supporting plate 19 of the first flywheel 18 is connected to the crank shaft 10 by a bolt 16. The first flywheel 18 is formed into approximately disc-like shape and comprises supporting plate 19 and friction plate 17. The plates 17, 19 are formed separately.

First flywheel 18 is set to a specified mass corresponding to power characteristics of the engine. In an outer part of the supporting plate 19, an approximately annular shaped flange part 19b is formed. As shown in FIG. 1b, holes 19a opens axially at plural positions of the flange part 19b in circumferential direction. In an outer part of the friction plate 17, projections 17a are formed which fit into the holes 19a. In FIG. 1, a return spring 15 is provided between the friction plate 17 and the supporting plate 19 so as to return the friction plate 17 rearward away from plate 19. The spring force of the return spring 15 is weaker than the diaphgram spring 13.

The friction plate 17 is connected in the circumferential direction to the supporting plate 19 by projections 17a in holes 19a. Holes 19a permit slide motion in axial direction.

In a rear end face of the supporting plate 19, to the left in FIG. 1, a clutch cover 35 is fixed. Diaphgram spring 13 presses against fulcrum land 46a of pressure plate 46 to engage facings 42, 44 of clutch disc 40 between pressure plate 46 and friction plate 17.

On the front face side of the first flywheel 18, a second flywheel 20 is installed concentrically with the first flywheel 18 with bearing 21 therebetween. A damper mechanism 24 is disposed at central part in radial direction of the clutch. Damper mechanism 24 is coupled resiliently between the first flywheel 18 and the second flywheel 20 in the circumferential direction. Bearing holder 21 is fixed by bolts on the second flywheel 20 and holder bearing 21.

The mass Di of the second flywheel 20 is set to a specified mass corresponding to an inertial mass of the transmission system such as a speed changer (not shown) coupled to a rear output stage of clutch 40. Ring gear 23 is formed on second flywheel 20 to mesh to a pinion gear of a stater motor, not shown.

The damper mechanism 24, FIG. 1a, includes approximately annular shaped side plates 26, 28 and a torsion spring 30. The inner part of the side plate 28 is fixed to the first flywheel 18 by a bolt 28a. The torsion spring 30 is set in a hole 32 of the second flywheel 20.

In FIG. 1a showing partial view in the direction of arrow "a" of FIG. 1, the bolt 28a is screwed to the first flywheel 18 through a flange part 29 formed at inner part of the side plat 28. The bolt 28a fix the side plate 28. Pins 31 are disposed on opposite sides of the torsion spring 30 plates 26, 28 are connected to each other by pins 31 as shown in FIG. 1c (FIG. 1c is c—c sectional view of FIG. 1a).

Torsion springs 30 are disposed at six places circumferentially around the whole clutch. Adjoining torsion springs 30 are provide 60° distance therebetween in circumferential direction as shown by angle between center lines 01, 02, FIG. 1a. Flange parts 29 are disposed at three places with 120° distances provided therebetween in circumferential direction.

Figure 3:
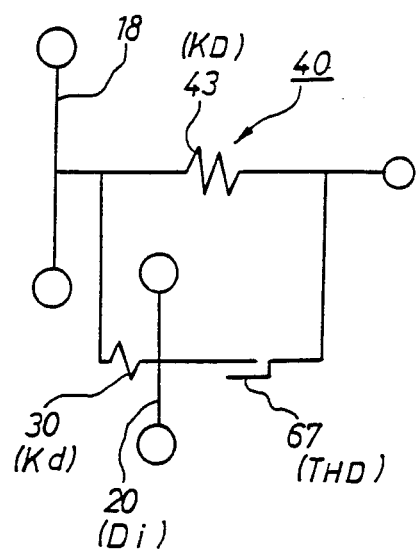
FIG. 3 is a schematic structure of the clutch shown in FIG. 1.

A spring constant Kd of the torsion spring 30 is set to absorb the vibration of the engine power which is input to the first flywheel 18. Thus, as shown in FIG. 3, the spring constant Kd is set to such a value that a resonance point 41a of a characteristic 40 representing a relation between a value of $|\theta 2/\theta 1|$ (absolute value) and an engine rotation speed N arises at a speed region lower than idling rotation speed I. The rate of change in angular speed for the first flywheel 18 is designated $\theta 1$ and the rate of change in angular speed for the clutch disc spline hub 41 is designated $\theta 2$.

Accordingly, at a normal speed region higher than the idling speed I, the value of $|\theta 2/\theta 1|$ decreases with an increase in the rotation speed so that the rate of change in angular speed $\theta 2$ for the clutch disc spline hub 41, a rotational fluctuation of speed changer, taken as vibration, becomes smaller to such an extent as to be practically negligible.

Friction damping mechanism 60 is an essential point of the present invention as described hereunder. Friction damping mechanism 60 is comprised of a holder 62, a pressing plate 68, a friction disc 66, friction facings 67, a conical disc spring 70 etc.. In clutch engaging operation, the facing 42, 44 of the clutch disc 40 are pressed between the friction plate 17 and the pressure plat 46, the friction damping mechanism 60 is adapted to damp vibrations of engine power transmitted from the crank shaft 10. The friction damping mechanism 60 transmits power of the second flywheel 20 to the spline hub 41 of the clutch disc 40.

The holder 62 is formed in an approximately annular shape continuously in the clutch circumferential direction. The cross sectional shape of the holder 62 if formed into approximately opposite L-shape having a flange part 63. Holes 63a are opened axially at four-places in circumferential direction of the holder 62, for example. The holder 62 is fixed to connecting bolts 72 by a screw (not shown), and is connected to the second flywheel 20 by the connecting bolts 72 passing through arcuate holes 74 in first flywheel 18, FIG. 1a. The connecting bolts 72 are disposed at six-places in circumferential direction of the clutch, for example, the bolts 72 through in arcuate holes 74 (FIG. 1a) of the first flywheel 18. The holes 74 are disposed at six-places at the same locations as the bolts. Arcuate holes 74 open at specified angles in the circumferential direction of the first flywheel 18.

Damper plate 68 is disposed on the clutch disc side of friction disc 66. In an outer part of the annular plate shaped damper plate 68, projections 69 are formed to connect the friction plate 17 through the holes 63a to flange part 63. Projections 69 pressed on step part 47 formed at inner part of friction plate 17.

Facings 67 are adhesively fixed to the opposite faces of friction disc 68. An inner part of the friction disc 66 is connected to a boss 67a spline fitted onto outer spline tooth 41a formed on an outer surface of the spline hub 41.

Bushings 45b are provided between hub flange 41b of the clutch disc 41 and clutch plate 45 and retaining plate 45a. The bushings 45b have low friction constant. Facings 42, 44 are of a so-called molding type and are adhesively fixed to plane plate shaped disc plate 39 which does not have a cushioning effect.

Conical disc spring 70 (spring member) is provided between the damper plate 68 and the holder 63 and presses pressure plate 46 rearward towards flywheel 18. In the clutch engaging mode, the step part 47 separates from the projection 69 and damper plate 68 is pressed to rearward toward flywheel 18 by spring force of conical disc spring 70. Damper plate 68 engages the friction disc 66. The spring constant of the conical disc spring 70 is set smaller than the spring constant of the return spring 15 which returns the friction plate 17.

In clutch engaging mode shown in FIG. 1, friction damping mechanism 60 transmits power from the second flywheel 20 to the spline hub 41 by the friction disc 66. In this instant, the friction damping mechanism connects the second flywheel 20 and the spline hub 41 by means of friction force generated between the facings 67 and the damper plate 68.

In clutch releasing mode when an outer part of the diaphgram spring 13 is pressed toward the arrow A direction by a release bearing (not shown), an inner part of the diaphgram spring 13 is adapted to return toward a arrow B direction, and to fade out its spring force. Because the friction plate 17 is pressed to rearward by spring force of the return spring 15, and the projection 69 of the damper plate 68 presses on the step part 47 of the friction plate 17, the damper plate 68 is connected to the friction plate 17 by friction force generated between the step part 47 and the projection 69.

In this instant, the damper plate 68 slides to rearward by spring force of the return spring 15 so as to separate from the friction disc 66. The spring force of the return spring 15 is stronger than spring force of the conical disc spring 70. The damper plate 68 presses the conical disc spring 70, to connect with the holder 62 by the projection 69, the holes 63a in circumferentially, to engage with the second flywheel 20 by the bolt 72. Therefore, in clutch disengaging mode, the damper plate 68, the holder 62 and the bolt 72 engage the second flywheel 20 with the friction plate 17 and restrict vibrations of the second flywheel 20.

As shown in FIG. 3 which schematically illustrates the above-mentioned clutch construction, the clutch disc 40 is disposed in parallel with the second flywheel 20 at a rear stage of the first flywheel 18. A torsion spring 43 is provided in the clutch disc 40. In the second flywheel 20, the torsion spring 30 is installed in series with the facing 67 of the friction damping mechanism 70.

At the time of clutch engagement, the pressure plate 46 is pressed forward, and the clutch disc 40 is pressed between the pressure plate 46 and the friction plate 17. As shown in FIG. 1, the friction plate 17 presses on the supporting plate 19 to depress return spring 15, the step part 47 of the friction plate 17 and the projection 69 of the damper plate 68 are separated, the damper plate 68 is pressed to forward by the spring force of the conical disc spring 70.

A power of the second flywheel 20 transmits to the spline hub 41 from the connecting bolt 72, the holder 62 and the friction disc 66. The engine power entered in the first flywheel 18 is transmitted to the speed changer through two routes: i.e. a route through the clutch disc 40 to the input shaft 14 and a route form the second flywheel 20 through the friction disc 66 of the friction damping mechanism 60 to the speed changer.

In this instance, an axial pressure force does not act on the clutch plate 45 and the retaining plate 45a because the friction disc 66 of the friction damping mechanism 60 are pressed by the spring force of the conical spring. Hysteresis torque is not generated on the bushes 45b of the clutch disc 40.

Under the above clutch engaging mode, as for a torque (average torque + fluctuating torque) transmitted from the engine to the speed changer, the fluctuating torque is removed by the second flywheel 20 and the damper plate 68 of the friction disc 66. Only the average torque is transmitted through the clutch disc 40 to the speed changer. The second flywheel 20 is springy supported to float by the torsional spring 30 of the damper mechanism 24. Therefore, the engine rotational fluctuation and the torque fluctuation can be removed substantially completely.

Under clutch releasing mode (disengage condition), the inner part of the diaphgram spring 13 presses toward to an arrow B, and spring force of the diaphgram spring 13 which transmits to the pressure plate 46 have faded out. Then, the friction plate 17 moves to rearward by spring force of the return spring 15, the friction plate 17 releases engaging of the clutch disc 40.

In this instant, the step part 47 of the friction disc 17 and the projection 69 of the damper plate 68 are engaged, pressing the damper plate 68 to rearward, that is, to the left in FIG. 1. The damper plate 68 slides to rearward against said spring force of conical disc spring 70. When the damper plate 68 moves to rearward, engaging of the friction disc 68 is released. Input shaft 14 can free rotate and operation of the speed changer is easy.

The damper plate 68 couples to the friction plate 17 by friction force generated between the projection 69 and the step part 47, compresses conical disc spring 70. The dampler plate 68 is connected to the holder 62 by means of friction force generated between conical disc spring 70 and the flange part 63, and engaging of the projections 69 the holes 63a. The second flywheel 20 is coupled to the friction plate 17 by the connecting bolt 72, the holder 62 and the damper plate 68. Vibration of the second flywheel 20 is restricted by the friction plate 17.

EFFECT OF THE INVENTION

As described above, the flywheel assembly of the present invention including a first flywheel 18 fixed to a crank shaft 10 of an engine; a second flywheel 20 installed concentrically with the first flywheel 18, the mass of the second flywheel 20 being set to specified mass; a damper mechanism 24 connects resiliently flywheel 18, 20 to each other; a friction damping mechanism 60 which transmits output power of the second flywheel 20 to a spline hub 41 of the clutch disc 40 only when the clutch disc 40 connects with the first flywheel 18; characterized by that the first flywheel 18 comprises separated supporting plate 19 and friction plate 17, the supporting plate 19 connected to the crank shaft 10, the friction plate 17 connected to the supporting plate 19 in circumferential direction, and the friction plate 17 is slidable axially on the supporting plate 19; a return spring 15 which presses the friction plate 19 toward the clutch disc 40 direction is provided between the supporting plate 19 and the friction plate 17; the friction damping mechanism 60 comprises a holder 62 connected to the second flywheel 20, a damper plate 68 held by the holder 62, and to slide axially by said friction plate 17, a friction disc 66 connected to the spline hub 41 of the clutch disc 40, the friction plate 17 is pressed by the damper plate 68, a conical disc spring 70 (spring member) presses the damper plate 68 toward the pressing direction of the friction disc 66; in the clutch engaging mode when the friction plate 17 presses to the supporting plate 19 against a spring force of the return spring 15, an output power from the second flywheel 20 transmits to the spline hub 41 of the clutch disc 40 to press the damper plate 68 onto the friction plate 17 by the conical disc spring 70 of the friction damping mechanism 60; in clutch releasing mode when the friction plate 17 moves toward the opposite direction to the supporting plate 19 side by the spring force of the return spring 15, the damper plate 68 slides toward releasing direction of the friction disc 66 against the spring force of the conical disc spring 70 corresponding to a return operation of the friction plate 17, and so as to connect the second flywheel 20 and the friction plate 17 by the friction damping mechanism 60. Therefore, the following advantages are obtained.

In the clutch engaging mode, as shown in FIG. 1, the step part 47 of the friction plate 17 and the projection 69 of the damper plate 68 are separated, the damper plate 68 is pressed forward, to the right in FIG. 1, by the spring force of conical disc spring 70, and presses the friction disc 66 of the friction damping mechanism 60 by the spring force of conical disc spring 70 and prevents axial pressure force from being generated on clutch plate 45 and unnecessary hysteresis torque on the bushes 45b of the clutch disc 40. Therefore, damping performance for the vibration by means of the friction damping mechanism 60 is improved.

Next, in clutch releasing mode (disengaging condition), the damper plate 68 connects to friction plate 17 by the projections 69 and step part 47. Conical disc spring 70, the flange part 63, and the second flywheel 20 are connected to the friction plate 17 by the connecting bolt 72, the holder 62 and the damper plate 68 and can restrict vibrations of the second flywheel 20 by the friction plate 17 and prevent a resonance phenomenon of the second flywheel 20 to generate. The resonance phenomenon in the second flywheel 20 is eliminated.

Further, the return spring 15 which provided between the friction plate 17 and the supporting plate 19, provides the cushion effect at the time of engaging mode of the clutch disc 40 a so-called mold type clutch disc 40 in which the facings 42, 44 are adhesively attached to the disc plate 39 can be employed.

I claim:

1. A flywheel assembly including a first flywheel fixed to a crank shaft of an engine; a second flywheel set to a specified mass and concentric with said first flywheel; a damper mechanism resiliently connecting said first and second flywheels; a clutch disc engagable with said first flywheel through clutch engaging means and having a spline hub engagable with an output shaft for connecting and disconnecting said first flywheel and said engine crankshaft with said output shaft; and, a friction damping mechanism for transmitting output power of said second flywheel to said spline hub of said clutch disc only when said clutch disc connects said first flywheel with said output shaft, characterized by that said first flywheel comprises a supporting plate and a friction plate, said supporting plate being connected to said crankshaft, said friction plate being connected to said supporting plate in the circumferential direction and being slidable relative to said supporting plate in the axial direction; a return spring between said supporting plate and said friction plate for pressing said friction plate toward said clutch disc; said friction damping mechanism comprising a holder connected to said second flywheel, a damper plate held by said holder and slidable axially on said holder by said friction plate, a friction disc connected to said spline hub of said clutch disc, said friction plate being engagable with said damper plate, a spring member pressing said damper plate toward pressing engagement with said friction disc; said friction plate, when said clutch disc is engaged with said first flywheel, pressing said return spring against said supporting plate, releasing said damper plate from engagement with said friction plate and said spring member of said friction damper mechanism engages said damper plate and said holder with said friction disc and the output power of said second flywheel is transmitted to said spline hub of said clutch disc; said friction plate, when said clutch disc is disengaged from said first flywheel, being pressed by said return spring away from said supporting plate, said friction plate engaging said damper plate, compresses said spring member of said friction damping mechanism and disengages said damper plate and said holder from said friction disc, releasing the transmission of output power from said second flywheel to said spline hub, and connecting said second flywheel to said first flywheel through said damper mechanism resiliently connecting said first and second flywheels.

2. A flywheel assembly as set forth in claim 1, in which said friction damping mechanism is disposed between said supporting plate of said first flywheel and said clutch disc and within the inner periphery of said friction plate and said holder of said friction damping mechanism is connected to said second flywheel by bolts extending through holes in said first flywheel supporting plate.

3. A flywheel assembly as set forth in claim 1, in which said supporting plate of said first flywheel has a cylindrical shaped flange extending axially of said supporting plate around the outer periphery of said supporting plate, said cylindrical shaped flange having axially extending holes at plural positions in the circumferential direction and said friction plate of said first flywheel has projections at its outer periphery fitted into said holes.

4. A flywheel assembly as set forth in claim 1, in which said friction plate of said first flywheel has a step part formed at its inner periphery and said damper plate slides in said step part as said clutch disc is disengaged from said first flywheel for releasing said friction damping mechanism.

5. A flywheel assembly as set forth in claim 1, in which projections are formed on the outer periphery of said damper plate at plural positions in the circumferential direction of said outer periphery, said projections are opposite to a step part formed on the inner periphery of said friction plate of said first flywheel and extend through holes extending axially in the outer part of said holder.

6. A flywheel assembly as set forth in claim 1, in which the spring constant of said spring member in said friction damping mechanism is less than the spring constant of said return spring.

* * * * *